United States Patent
Chiang

(10) Patent No.: US 6,313,195 B1
(45) Date of Patent: Nov. 6, 2001

(54) NATURALLY DISINTEGRATABLE CUSHION MATERIAL AND METHOD FOR MAKING THE SAME

(75) Inventor: Chin-Cheng Chiang, Miao-Li Hsien (TW)

(73) Assignee: Chun-Huei Chen, Miao-Li (TW)

( * ) Notice: Subject to any disclaimer, the term of this patent is extended or adjusted under 35 U.S.C. 154(b) by 0 days.

(21) Appl. No.: 09/594,162

(22) Filed: Jun. 15, 2000

(51) Int. Cl.$^7$ .................. C08K 5/00; C08L 3/00
(52) U.S. Cl. .................................. 523/128; 524/47
(58) Field of Search .................... 524/47; 523/128

(56) References Cited

U.S. PATENT DOCUMENTS 6,025,417 * 2/2000 Willett et al. ................ 524/17

* cited by examiner

Primary Examiner—Kriellion A. Sanders
(74) Attorney, Agent, or Firm—Birch, Stewart, Kolasch & Birch, LLP

(57) ABSTRACT

The present invention provides a naturally disintegratable cushion material and the process for making the material. The cushion material is non-toxic and environmental protective that it can be disintegrated naturally after being discarded. The cushion material is made from main material powder of grain shells, added with fillers (such as calcium carbonate), binders (such as polyvinyl alcohol) in suitable percentages, and further mixed with softeners (such as trimethylolpropane, polyethylene glycol or glycerine), water and other assistances (such as wax and boric acid) to form into a composite which includes moisture. Then the composite is heated and extruded by an extruder to vaporize the moisture in the composite and foamed. The foamed material is finally dried into cushion materials of desired shapes.

23 Claims, 2 Drawing Sheets

NATURALLY DISINTEGRATABLE CUSHION MATERIAL AND METHOD FOR MAKING THE SAME

BACKGROUND OF THE INVENTION

1. Field of the Invention

The present invention relates to a naturally disintegratable cushion material and the process for making the material. The cushion material is easy to be fabricated, non-toxic and environmental friendly because of being made from natural organic materials, which can replace the traditional styrofoam or corrugated papers.

2. Related Art

It has been known by people to use cushion materials in packaging goods in order to prevent the goods from being damaged during transportation. A cushion material mostly used in the earlier time is styrofoam which has the disadvantages of being difficult to disintegrate, unsuitable to be burned out and harmful to the environment if being buried in the ground. Therefore, under the situation of increasing awareness of environmental protection around the world, styrofoam material is gradually replaced by paper materials such as corrugated papers or other paper products. When the cushion materials are unused anymore and discarded, they have to be burned out or buried. It costs much energy to burn out the disposed materials under high temperature in a burning oven, while it requires a large space of ground and takes a long time to bury and disintegrate the disposed materials. Therefore, the burning and burying methods have their defects.

Also, the paper materials made from trees require planting the trees with a long time. Felling the trees results in an ecological imbalance, and the paper materials use lots of raw materials of wood which are complicated and costly.

SUMMARY OF THE INVENTION

The primary objective of the present invention is thus to provide a cushion material which can be disintegrated naturally into an organic manure. The cushion material is made from grain shells, added with non-toxic and disintegratable binders, fillers and softeners. So that, the cushion material can be disintegrated into an organic manure in the nature environment without needs of burning or burying. It is environmental friendly and highly practical.

Another objective of the present invention is to provide a method for making a disintegratable cushion material.

According to the present invention, the process for making a disintegratable cushion material includes the following steps. Mixing uniformly the main material powder ground from grain shells; fillers, such as calcium carbonate ($CaCO_3$); and binders, such as polyvinyl alcohol (PVA) in suitable percentages. Adding the mixture with boric acid ($HBO_3$), wax and softeners, such as trimethylolpropane (TMP), polyethylene glycol or glycerine. Harmonizing and binding the aforesaid materials with water into a moldable mixture, then extruding the mixture by an extruder. Meanwhile, vaporizing the water in the mixture by heating the mixture in the extruder with a temperature around 110 to 120 centigrade degrees so a to make it foams into a light weight, high strength and environmental protective cushion material.

The main material used in the present invention is taken from grain shells. Since the grain shells are great in quantity as they are taken from the great amount of grains, and are usually wastes or very low in price even being usable for some other applications, they are very easy to be obtained. On the contrary, the prior arts of so-called environmental protective materials are made from woods or papers. Since they are not easy to be obtained as we have to plant and fell the trees, they are more expensive than the material for the present invention. Moreover, excessive felling of trees has made forests less and less in the earth, which results in an ecological imbalance, higher production cost, and even causes problems in soil retention of earth.

The objectives and advantages of the present invention will become apparent from a detailed description provided below, with reference to the accompanying drawings.

Further scope of the applicability of the present invention will become apparent from the detailed description given hereinafter. However, it should be understood that the detailed description and specific examples, while indicating preferred: embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
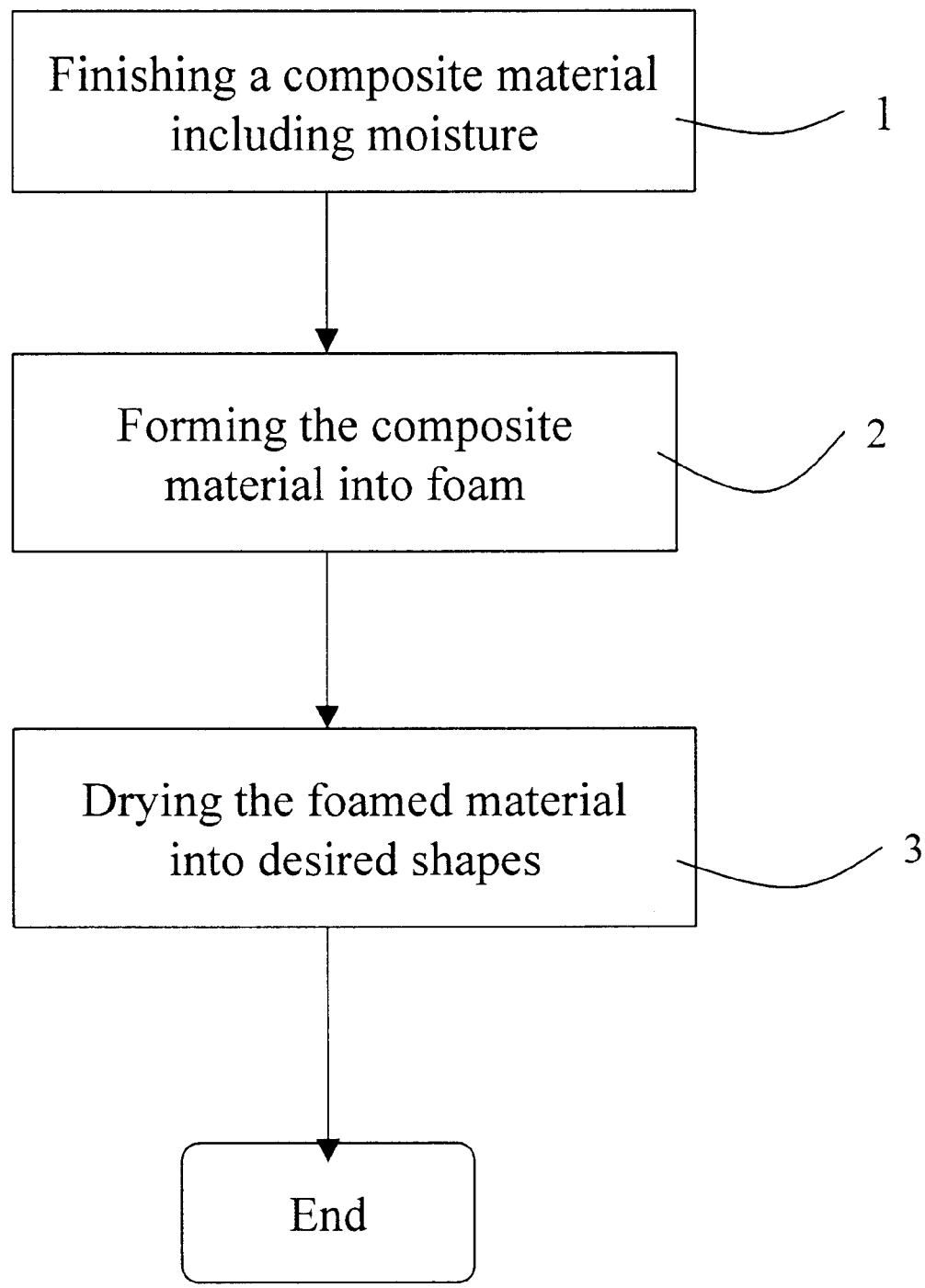
FIG. 1 is a flowchart showing the process for making a cushion material of the present invention.

The cushion material according to the present invention is composed by the following materials:

a) the main material powder made from grain shells;

b) a filler, for filling up the clearance in the composite;

c) a softener, for increasing the extensibility and elasticity of the composite so as to make it foamable;

d) water; and e) binder, by medium of water, for binding the main material, the filler and the softener into a paste.

Besides the aforesaid four components, the following assistances can be added according to the requirements of manufacturing:

f) adhesives, for enhancing the viscosity of the composite; and g) releasing agent, for enabling easy departing of the finished material from its mold.

The kinds and weight percentages of the composite components according to the present invention are listed below.

| Component | Material | Weight Percentage (%) |
|---|---|---|
| Main material powder | Grain shells | 33%~37% |
| Filler | Calcium carbonate | 21%~25% |
| Water | | 22%~26% |
| Binder | Polyvinyl alcohol | 10%~14% |
| Adhesive | Boric acid | 1%~5% |
| Releasing agent | Wax | 1%~5% |
| Softener | Trimethylolpropane | 1%~5% |
| | Polyethylene glycol | 1%~5% |
| | Glycerine | 1%~5% |

The main material powder is taken from shells of natural grains, such as rice, peanuts, wheat, straws or coconuts, and ground into powder. The material is selected from those natural materials which can be disintegrated naturally. Therefore, besides the aforesaid materials, the powder can also be ground from seashells or other materials which are disintegratable in a shorter time.

By considering environmental protection and safety, the filler is preferred of calcium carbonate ($CaCo_3$) which is colorless, insipid, non-toxic and disintegratable only beyond 850 centigrade degrees. Therefore, it is ensured to be stable from being manufactured, used by users, discarded, till disintegrated, and won't do any harm to human or the environment. Besides the calcium carbonate, other similar materials can be used for filling the clearances in the composite and increasing the density and stiffness of the composite.

By considering environmental protection, common organic or inorganic chemical softeners are not used, but the trimethylolpropane (TMP), polyethylene glycol or glycerine is selected as the softener. The trimethylolpropane is used to enhance the extensibility and elasticity of the composite, and make it foamable. The glycerine is selectively added for retaining the moisture of the composite and preventing it from being hard. Other moisture-retaining materials can also be used. Adjusting the percentage of the binder and the main material is also effective for softening.

Polyvinyl alcohol (PVA) is selected as a binder which is non-toxic, already used in some medicines, and meets the requirements of environmental protection. The polyvinyl alcohol is a high molarity material in which a higher molecular weight gives a lower viscosity. Therefore, a certain polyvinyl alcohol having a suitable molecular weight can be chosen according to the requirements.

Boric acid ($HBO_3$) is used as an adhesive to enhance the viscosity of the polyvinyl alcohol and to increase the strength of the composite.

Wax, such as paraffin wax, can be used for easy separation of the finished cushion material from its mold. Other materials, such as oils or boric acid solutions can also be used.

FIG. 1 illustrates the manufacturing process for the cushion material of the present invention. The process includes steps of:

1) finishing a composite material including moisture;
2) extruding the composite by an extruder in which heat is provided to vaporize the moisture in the composite and form the material into foam; and
3) drying the foamed material into a cushion material of desired shape.

Figure 2:
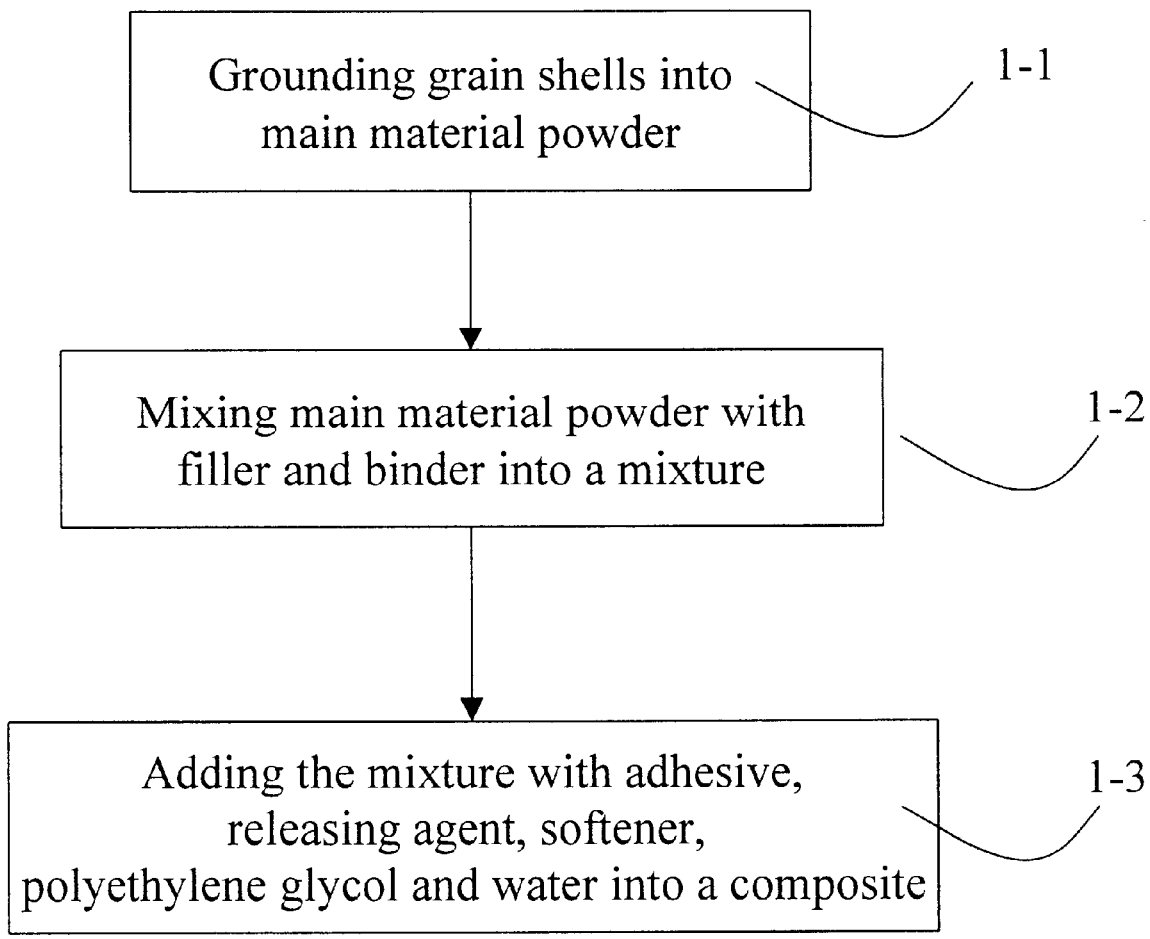
FIG. 2 is a detailed flowchart of the step 1) in FIG. 1.

The detailed steps of the aforesaid step 1) is shown in FIG. 2 which includes the following steps:

1-1) grinding grain shells into main material powder;
1-2) mixing the main material powder with a filler, such as calcium carbonate ($CaCO_3$), and a binder, such as polyvinyl alcohol (PVA), with a mixer for about a minute to form a mixture in which the weight percentage of the powder, as shown in the aforesaid table, is 33%~37%; the filler is 21%~25%; while the binder is 10%~14%; and
1-3) adding the mixture with an adhesive, such as boric acid; a releasing agent, such as wax; and a softener, such as trimethylolpropane (TMP), polyethylene glycol or glycerine, and stirring them for about two minutes to form them into a composite having a moisture percentage of 22%~26% as shown in the table. The rest weight percentages of the adhesive and the softener are 1%~5% respectively.

In the step 2) of foaming, the extruder is heated at a temperature around 110 to 120 centigrade degrees so as to vaporize the moisture (water) in the composite and form it into a foam material.

In the step 3) of drying, the foamed material is dried into desired shapes, such as boards or strips. Then, the cushion material is made.

When the cushion material is not used anymore, it can be discarded in the natural environment, so that it absorbs moisture and disintegrates in a short time. The organic ingredients from grain shells in the cushion material have the value of manure, or even some organic manure can be added into the material during manufacturing. The disintegrated material may flow into rivers or lakes, becomes the food of fish and generates no pollution.

As described above, the present invention overcomes the defects of traditional styrofoam or corrugated papers and provides a naturally disintegratable cushion material and the process for making the material. The cushion material has at least the following advantages:

a) It is environmental friendly that won't pollute the environment after being discarded. Because of being made from non-toxic natural organic materials, it can be disintegrated in a short time period when being exposed in the natural environment. After disintegration, it becomes manure for plants, or flows into rivers or lakes and becomes food of fish. Therefore, it won't cause any pollution;

b) The raw material is cheap and easy to be obtained. The main material according to the present invention is taken from grain shells which are of a great amount and very easy to be obtained. The grain shells are currently used for forage only without other evident usage, so that they are in a low price; and c) The process is suitable for mass production, since the composite material according to the present invention is soft and moldable for machine working.

While the invention has been described in its preferred embodiments, it is to be understood that the words which have been used are words of description rather than limitation and that changes within the purview of the appended claims may be made without departing from the true scope and spirit of the invention.

What is claimed is:

1. A naturally disintegratable cushion material made from a composite at least comprising the following materials:

a) a main material powder made from grain shells;
b) a filler for filling up the clearance in the composite;
c) a softener, selected from trimethylolpropane and polyethylene glycol, for increasing the extensibility and elasticity of the composite; and
d) a binder, such as polyvinyl alcohol, by medium of water, for binding the main material, the filler and the softener into a paste.

2. A naturally disintegratable cushion material according to claim 1 wherein the composite further comprises:
   a) an adhesive, such as boric acid, for enhancing the viscosity of the composite; and
   b) a releasing agent, such as wax, for enabling easy departing of a finished composite material from a mold.

3. A naturally disintegratable cushion material according to claim 1 wherein the softener further includes glycerine for retaining the moisture of the composite and preventing the same from being hard.

4. A naturally disintegratable cushion material according to claim 2 wherein the softener further includes glycerine for retaining the moisture of the composite and preventing the same from being hard.

5. A naturally disintegratable cushion material according to claim 1 wherein the grain shells for main material powder are shells of rice.

6. A naturally disintegratable cushion material according to claim 1 wherein the grain shells for main material powder are shells of peanuts.

7. A naturally disintegratable cushion material according to claim 1 wherein the grain shells for main material powder are rice straws.

8. A naturally disintegratable cushion material according to claim 1 wherein the grain shells for main material powder are shells of coconuts.

9. A naturally disintegratable cushion material according to claim 1 wherein the grain shells for main material powder are shells of wheat.

10. A process for making a naturally disintegratable cushion material comprising steps of:
    1) finishing a composite material including moisture including the step of grinding grain shells into main material powder;
    2) extruding the composite by an extruder in which heat is provided to vaporize the moisture in the composite and form the material into foam; and
    3) drying the foamed material into a desired cushion material.

11. A process for making a naturally disintegratable cushion material according to claim 10 wherein the step 1) further comprises steps of:
    1-1) mixing the main material powder with fillers and binders to form a powder mixture; and
    1-2) adding the mixture with adhesive; releasing agent; softener and water and stirring into a composite having moisture.

12. A process for making a naturally disintegratable cushion material according to claim 11 wherein the softener is selected at least from trimethylolpropane and polyethylene glycol.

13. A process for making a naturally disintegratable cushion material according to claim 12 wherein the softener further includes glycerine.

14. A process for making a naturally disintegratable cushion material according to claim 11 wherein the weight percentage of the main material powder is around 33%~37%.

15. A process for making a naturally disintegratable cushion material according to claim 11 wherein the weight percentage of the filler is around 21%~25%.

16. A process for making a naturally cushion material according to claim 11 wherein the weight percentage of the binder is around 10%~14%.

17. A process for making a naturally cushion material according to claim 11 wherein the weight percentages of the adhesive and the releasing agent are around 1%~5% respectively.

18. A process for making a naturally cushion material according to claim 11 wherein the weight percentage of the softener is around 1%~5%.

19. A process for making a naturally cushion material according to claim 11 wherein the weight percentage of water is around 22%~26%.

20. A process for making a naturally cushion material according to claim 10 wherein the temperature of the extruder is around 110~120 degrees centigrade.

21. A naturally disintegratable cushion material according to claim 1 wherein the filler is calcium carbonate.

22. A naturally disintegratable cushion material according to claim 1 wherein weight percentage of the main material powder is around 33%–37%.

23. A process for making a naturally disintegratable cushion material according to claim 11 further comprising the steps of using calcium carbonate as the fillers, using polyvinyl alcohol as the binders, using boric acid as the adhesive and using wax as the releasing agent.

* * * * *